United States Patent [19]

Haun

[11] Patent Number: 4,843,220
[45] Date of Patent: Jun. 27, 1989

[54] AUTOMATIC DATA CAPTURE FOR MULTIPLE FORM POINT OF SALE SLIP PACKS

[75] Inventor: Marion W. Haun, Torrance, Calif.

[73] Assignee: American Magnetics Corporation, Carson, Calif.

[21] Appl. No.: 25,482

[22] Filed: Mar. 13, 1987

[51] Int. Cl.⁴ .............................................. G06K 5/00
[52] U.S. Cl. .................................................. 235/380
[58] Field of Search ........................ 235/380, 420, 449

[56] References Cited
U.S. PATENT DOCUMENTS
4,225,780 9/1980 Jacoub et al. ........................ 235/449

Primary Examiner—Roy N. Envall, Jr.
Attorney, Agent, or Firm—Stanger, Michaelson, Reynolds, Spivak & Tobia

[57] ABSTRACT

An automatic data collection system for recording transaction data from a point of sale terminal employs a magnetic stripe on the back of the bank copy of the familiar sales slip pack. In response to the receipt of a credit authorization number, the POS terminal is operative to transfer tansaction data from the credit card magnetic stripe to the sales slip pack magnetic stripe for automatic recordation by the credit card issuer or its designee. The arrangement obviates the need for manual key operation to record the tyransaction data at the bank.

12 Claims, 6 Drawing Sheets

FIG. 4
AMDC TERMINAL
BLOCK DIAGRAM OF OPERATION

AUTOMATIC DATA CAPTURE FOR MULTIPLE FORM POINT OF SALE SLIP PACKS

FIELD OF THE INVENTION

This invention relates to an automatic data capture system for sales transactions and more particularly to multiple form sales slips generated at a point of sale as a record of a purchase for credit.

BACKGROUND OF THE INVENTION

At present, there are three types of bond and credit card systems in use. A first of these systems is a debit-point of sale system in which all transactions are processed electronically and the card holder's bank account is debited immediately. This system is not a true credit system and the card holder's card serves only for identification and as a means for transferring data from the magnetic stripe on the credit card to the bank's data bank.

A second system is a paperless system in which a sales transaction is recorded and processed electronically. This system also uses credit cards each of which beam a magnetic stripe encoded with the customer's name, account number, and other discretionary data such as the card expiration date and security data. The card also identifies the card issuing association (i.e., Visa, Master Card etc.) and its member bank if applicable.

The point of sale terminal in such a second system contains a magnetic stripe reader, a display, a keyboard and a modem often with automatic dialing capability. The terminal also frequently includes a printer or an imprinter for recording the transaction on a multi-form sales slip.

In the context of one of these second systems, a sales clerk swipes a credit card through a magnetic stripe reader and keys in the dollar amount of the sale along with other discretionary data. The clerk then presses a key to transmit the data. The terminal responds by dialing the number of the local concentrator for the card-issuing association. When the concentrator responds, the terminal transmits the transaction data and awaits a credit authorization response.

The National Data Corporation (NDC) network transmits the transaction data to the data bank of the credit card issuer. The issuer's data bank is searched and a credit authorization number is transmitted back to the point of sale (POS) terminal where the transaction originated. If credit is authorized, the sales clerk writes the sales authorization number on the sales slip.

A sales slip is now generated in one of two ways. In the first, the credit card embossing is transferred to the sales form and the clerk writes in the dollar value of the sale.

The second way uses a printer. In this instance, the magnetic stripe information on the credit card and the dollar value of the sale are printed on the sales form, one copy of which is returned by the merchant and another of which is given to the customer.

The third system is a paper system which is used for 90-95 percent of all bank and credit card transactions. Merchant payments and account settlements all depend on the information contained on the sales form copy that is mailed to credit card companies such as Diners or American Express, by the merchant.

In the paper system, credit authorization is handled by the NDC network described above. The sales transaction data, though, is entered into the computer by a central bank clearing house operator who reads the bank copy of the standard sales slip form pack and enters the pertinent information into the computer by means of a keyboard.

Operation in the paper system requires a credit authorization request. If authorization is granted, the sales clerk enters the authorization number on the multislip sales form. Thereafter, the customer card is placed in an imprinter and the multislip sales form is positioned over the card in a familiar fashion. The sales clerk activates the imprinter to transfer embossed characters on the card to the sales form along with other information such as the name and account number of the merchant and the data of the transaction. The embossed information on the card includes the customer's name, account number and the expiration date, only the account number being presented in machine readable form. The clerk completes the transaction by entering the dollar values of the transaction plus other data such as the tax, the tip and the total. One copy is given to the customer, one is sent to the card issuer, and the merchant retains the remaining copies.

The merchant tabulates the issuers copies and delivers a collated package to the designated agent of the issuer for ultimate delivery to a central bank. The central bank microfilms each sales slip, assigning a tracer number to each slip. Next a stack of slips is fed into an optical character recognizer (OCR) which reads the account number. The operator keys in the dollar amount and enters carriage return at which time the data goes to the computer. If the OCR device fails to read a slip, the operator has to key in the account number as well as the dollar value.

The data thus obtained are processed, stored, and transmitted electronically to member and associated banks. Bills are generated and mailed to card holders by the member banks.

Major oil companies imprint customer's account number, the dollar value, the merchant's account number, the date of the transaction, and the invoice number all in machine readable form on the sales slip so that the required transaction data can be read and entered into a computer without the need of an operator.

SUMMARY OF THE INVENTION

In accordance with the principles of the present invention a magnetic stripe is provided conveniently on the back of a multislip sales pack and adapted to record all necessary transaction data. The point of sale terminal includes a tray in which a credit card having a magnetic stripe is placed with the sales form packet properly located beneath it. The terminal includes a movable carriage with an imprinter and a magnetic stripe reader/encoder arrangement adapted to transfer data from the magnetic stripe of the credit card to the magnetic stripe of the sales packet. The sales clerk keys in the dollar amount and presses an "enter" key. The carriage moves to enable the magnetic stripe on the credit card to be read and automatically dials the credit authorization network concentrator. When the concentrator responds, the point of sales (POS) terminal transmits the customer's account number and dollar amount and awaits a credit authorization number. Upon receipt of the authorization number, the terminal carriage is returned to a home position during which time the sales pack is embossed and the pertinent data is stored on the magnetic stripe of the sales form. If credit is denied, carriage return occurs without imprinting or encoding.

Thus, a POS credit transaction system adapted for automatic data capture in accordance with the principles of this invention includes a multiform sales slip pack with a magnetic stripe, and imprinter along with a magnetic stripe reader and encoder responsive to a credit authorization code for imprinting embossed data and for magnetic stripe encoding. The issuer copy contains the magnetic stripe thus permitting automatic entry of all transaction data.

Another embodiment is adapted to permit movement of a credit card manually by the clerk during initial data entry for credit authorization and thereafter movement of the sales pack for recording sales transaction data on the magnetic stripe on the sales pack. The sales pack magnetic stripe is moved, by the clerk or automatically on a carriage, and that movement occurs only after a credit authorization number is received, resulting in the encoding of all transaction data on the sales pack magnetic stripe.

DETAILED DESCRIPTION OF AN ILLUSTRATIVE EMBODIMENT OF THE INVENTION

Figure 1:
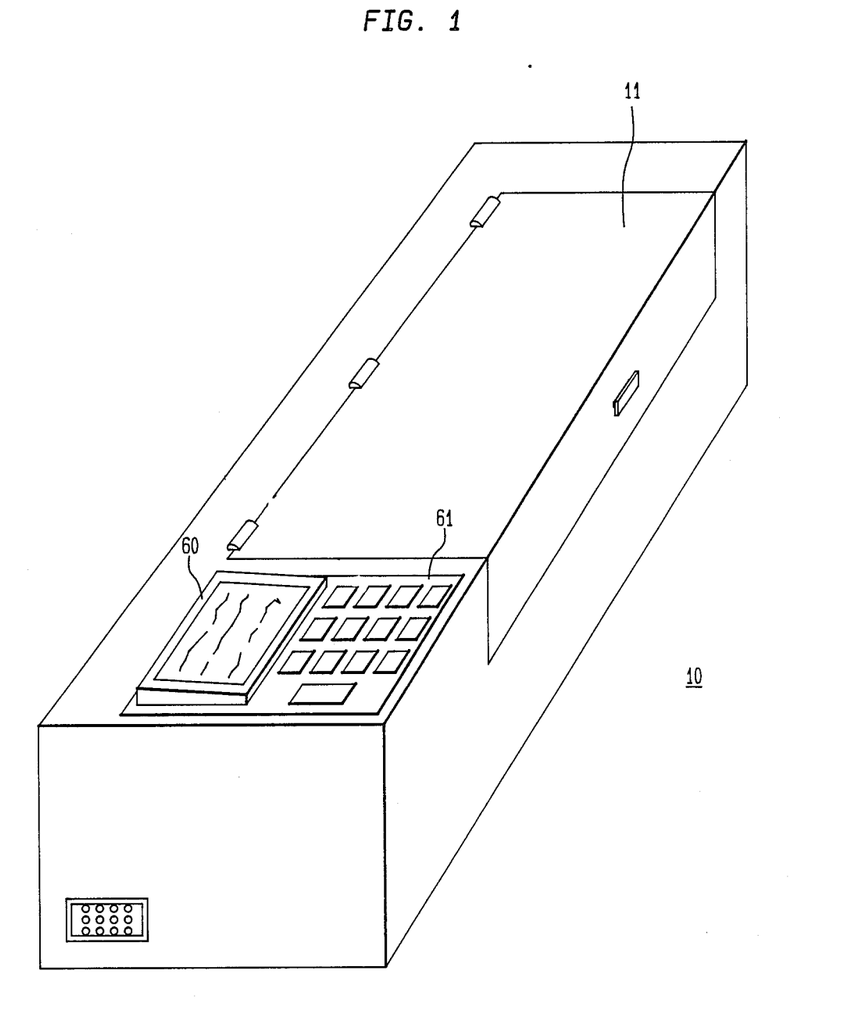
FIG. 1 is a schematic front perspective view of a point-of-sale terminal in accordance with the principles of this invention.

FIG. 1 shows a point of sale terminal 10 in accordance with the invention. The terminal 10 comprises a rectangular case conveniently measuring twelve by seven by six inches. The case includes an eight inch hinged cover 11 which lifts to expose a carriage on which a conventional multiform sales slip pack is placed. The cover 11 is preferably transparent to permit a customer to observe the credit card transaction.

Figure 2:
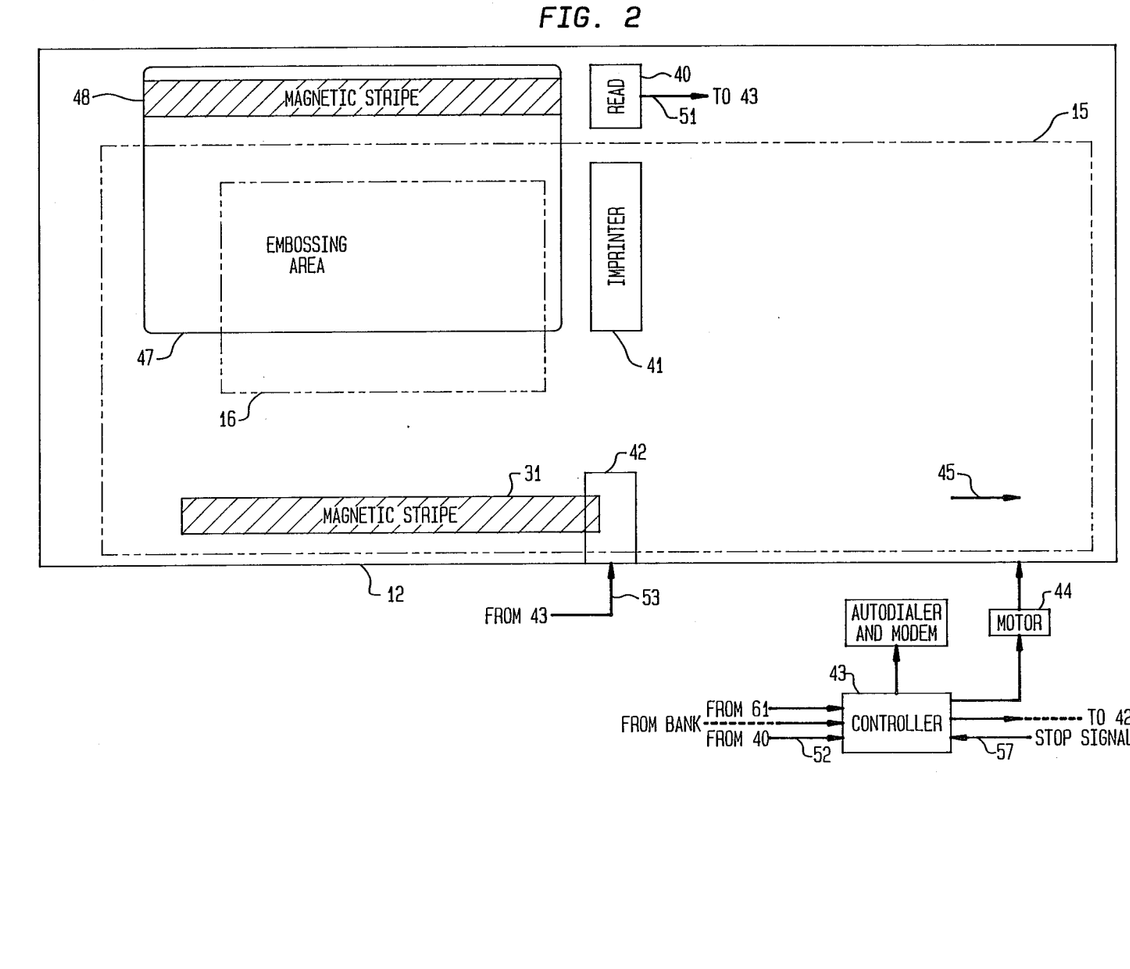
FIG. 2 is a plan view of the terminal of FIG. 1 with the cover open and both a credit card and sales slip pack positioned for a transaction.

FIG. 2 shows a schematic top view of the portion of the terminal exposed when cover 11 is lifted. The exposed portion of the terminal includes a carriage 12. Carriage 12 is adapted to receive the conventional fifty one column or eighty column multiform sales slip pack in use today. The carriage 12 is also adapted to receive a credit card. Position of the carriage 12 for an eighty column sales slip is identified by broken rectangle 15 and a credit card 47 is represented by rectangle 16. The magnetic stripe on the credit card 47 is designated 48.

Figure 3:
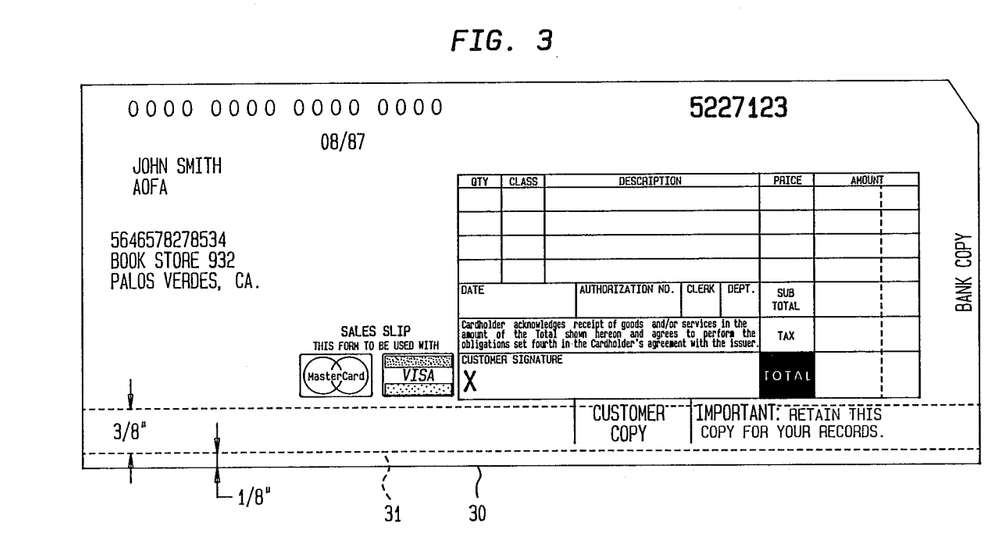
FIG. 3 is a plan view of a sales slip used with the terminal of FIG. 1.

FIG. 3 shows a typeset sales slip 30 from a multiform slip pack. The slip 30 is identified as a bank copy which typically is the rear copy of the pack. The bank copy includes a magnetic stripe on its near surface. The magnetic stripe is designated 31 and may extend across the entire slip 30 or only a portion of it. The slip pack is placed on the carriage 12 in the same way as it is now placed at point of sale terminals. The entire carriage 12 moves to carry the card and the slip illustratively in a first direction to the right as viewed in FIG. 2 and then to the left.

The carriage moves with respect to fixed elements which are operative to imprint the embossed credit card information on the slip pack, to read the magnetic stripe 17 on the credit card and to encode the magnetic stripe 31 on the slip pack. Thus, although the general configuration of the carriage is similar to the tray in which a credit card and slip pack is placed in the prior art point of sale device, the carriage herein is arranged to move rather than have an imprinter move with respect to the tray as is currently done.

The positions of a magnetic stripe reader 40 on imprinter 41, and a magnetic card encoder 42 are shown in FIG. 2. In response to the receipt of a credit authorization code; a controller represented by block 43 activates motor 44 to move carriage 12 to the right as viewed in FIG. 2 as represented by arrow 45. In response, credit card 47 is moved to the right by the motor so that the data in magnetic stripe 48 thereon is read by reader 40. The structure and operation of a magnetic stripe reader are well understood and are not described in detail herein. Such a reader operating in a manner compatible with the requirements of the present invention is available commercially in several products of the assignee of the present invention.

The data read from the magnetic stripe 48 is encoded in the magnetic stripe 31, shown both in FIGS. 2 and 3, via controller 43 as indicated by arrow 51, 52 and 53. The movement of the carriage 12 is constrained at a stop (not shown) placed to permit sufficient movement to allow the reading of the magnetic stripe 48 and the encoding of the magnetic stripe 31. The arrival of the carriage 12 at the stop is indicated by a convenient sensor which applies a signal to controller 43 along conductor 57 to reverse the direction of the motor 44. Imprinter 41 is operative to imprint on slip pack 30 the data embossed on the credit card 47 when the carriage 12 is moved to the left as viewed in FIG. 2. Reader 40 and encoder 42 are disabled during movement of the carriage 12 to the left. Imprinter 41 is adapted to swing free of slip pack 30 when movement to the right occurs. The operation of the imprinter may be accomplished by hand as by a suitable mechanical arrangement not shown.

The return of the carriage 15 to the extreme left a viewed in FIG. 2 is sensed by a suitably placed sensor and a stop-left or home signal is sent on conductor 57 to controller 43 to end the transaction. All the transaction information now is on the bank's copy of the slip pack in machine readable form.

A point of sale terminal in accordance with this invention thus is operative to transfer customer, merchant and transaction data from the credit card to a magnetic stripe on the bank's copy of the sales slip pack, all responsive to the receipt of a credit authorization number or code. In the absence of the receipt of a credit authorization code, no transfer of data is made.

The terminal of FIG. 1 is equipped with a display 60 and a keypad 61. The display 60 and keypad 61 operate in the same manner as they do in present point-of-sale terminal. Any numbers keyed in by the sales clerk are displayed as in the credit authorization code. These numbers (total, tax, etc.) are conveniently added to the sales slip by the clerk for visual inspection by the customer but also are communicated to the credit authorization entity along with the request for an authorization code. The authorization entity thus has in its data banks, the numbers of the sales transaction associated with the credit authorization number for later consolidation when the bank copy of the slip pack is received.

Figure 4:
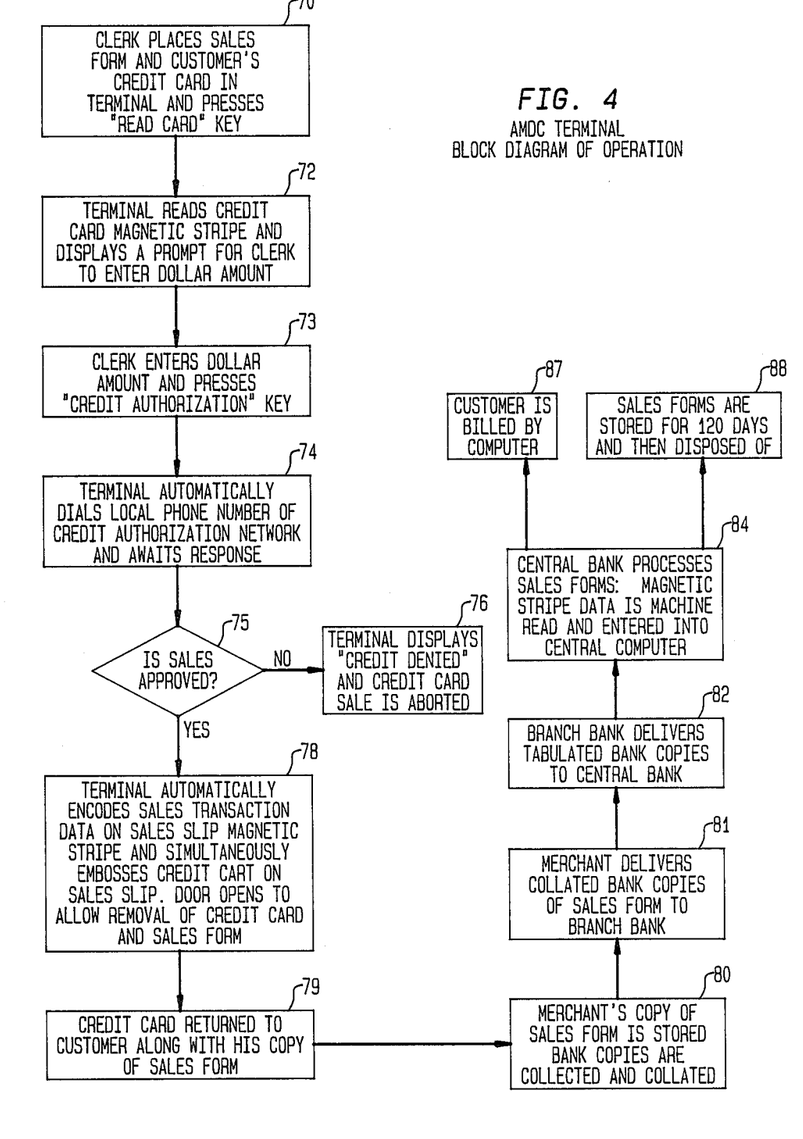
FIG. 4 is a block diagram of the operation of the invention using the terminal of FIG. 1.

FIG. 4 is a block diagram of the operation of the use of a point-of-sale terminal in accordance with the principles of this invention. Block to indicates that the operation is initiated with the positioning of the sales slip pack in the carriage of the terminal followed by the activation of a "read card". In response, the carriage moves to the right and the reader reads the magnetic stripe on the card and displays a prompt for the sales clerk to enter the dollar amounts. This in indicated by block 72.

The next block, 73, indicates the entry of the dollar amounts and the activation of a credit authorization key in keypad 61. Block 74 indicates that the terminal is adapted to dial the local phone number of the credit authorization network and await a response.

Operation thereafter depends on the response as indicated by block 75. If the sale is approved, the terminal automatically encodes the transaction data (including dollar amounts if desired) on the sales slip pack magnetic strip followed by the imprinting of the embossed characters of the credit card as described above. Door 11 opens to allow removal of the card and sales slip pack. Block 78 indicates this operation.

The remainder of the transaction is quite similar to that in current use. Specifically, the credit card and customer copy of the transaction is returned to the customer as indicated in block 79. The merchant stores his copy and collates the bank copies as indicated by block 80. The merchant then delivers the collated bank copies to the branch bank as indicated by block 81. The branch bank delivers tabulated bank copies to the central bank as indicated by block 82.

Importantly, the central bank processes the sales slip magnetic stripe data by machine, not by key punch operator, and stores the data in a central computer as indicated by block 84.

The customer is billed by the computer from the data on the magnetic stripes of the tabulated sales slips relating to the particular customer as indicated by block 87. The bank copies of the sales forms are stored for 120 days and then disposed of as indicated by block 88. Microfilm copies of the sales slips are retained.

It should be clear at this juncture that the automatic transfer of credit card magnetic data and/or transaction dollar amounts on a magnetic stripe on the bank's copy of a sales slip pack eliminate the need for key punching large amounts of data manually. Such manual operations are becoming so burdensome and expensive that plane loads of sales slips are being flown offshore where large keypunch operations are being set up.

Figure 5:
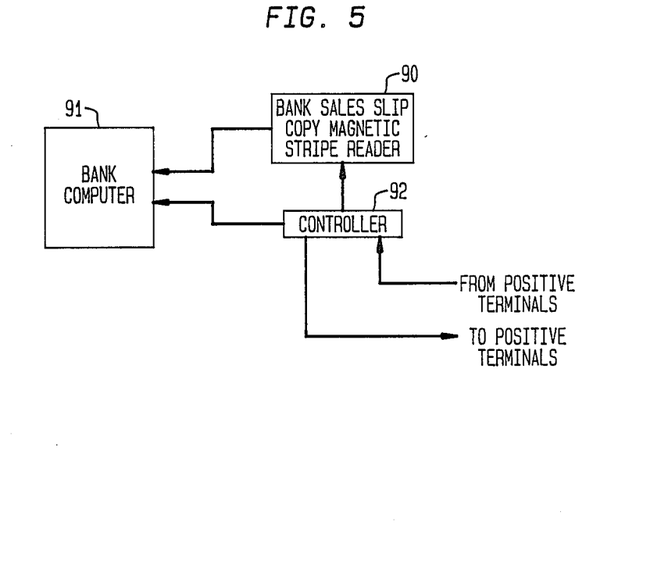
FIG. 5 is a block diagram of a portion of a system reader operative with the terminal of FIG. 1

The use of a magnetic stripe on the bank's copy of a sales slip pack and a terminal operative to transfer card and/or keypunch data to that magnetic stripe obviates the need for such operations so long as the banks are set up to read the magnetic stripes on the sales slip packs. In accordance with the system aspects of this invention the banks are equipped to so read the magnetic stripe and include equipment to that end. FIG. 5 indicates an appropriate magnetic stripe reader 90 adapted to read the bank sales slip copy magnetic stripe and to enter the data thereon into the bank computer indicated by block 91. Operation is controlled by a controller 92 responsive to signals from POS terminals and operative to send credit authorization numbers to requesting ones of such terminals.

Figure 6:
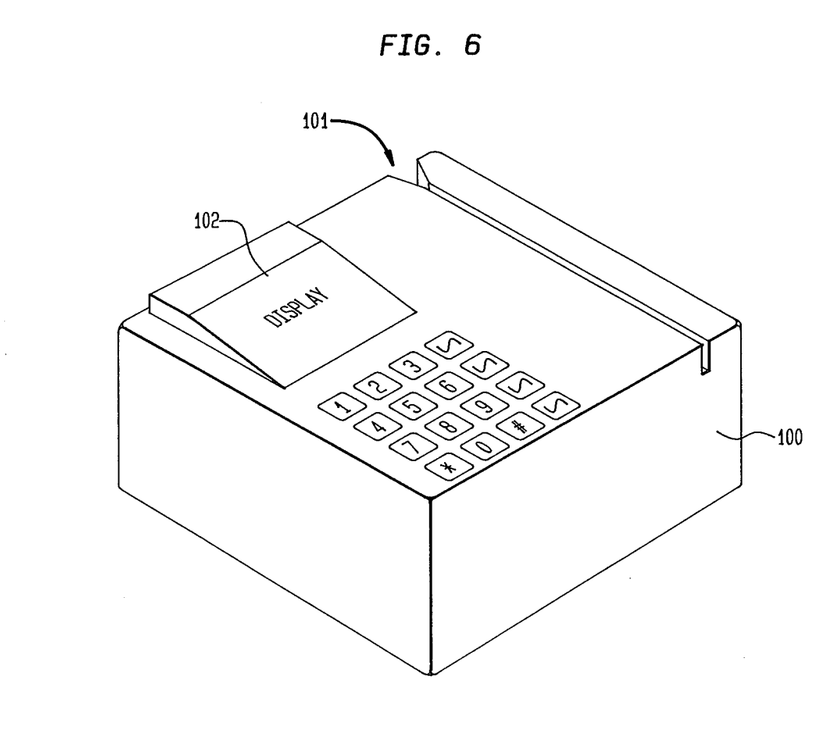
FIG. 6 shows a front perspective view of a magnetic swipe reader suitable for the manual mode of the invention.

It is possible to operate a system in accordance with the principles of this invention in a manual mode. In this instance, the carriage of FIG. 1 is not motorized. Instead, a sales clerk operates the carriage manually in response to prompting signals indicated on a display. FIG. 6 shows a suitable magnetic card swipe reader plus key pad and display terminal 100 suitable for the manual mode. The terminal also includes an auto dialer and a modem as in the foregoing embodiment.

The terminal includes a swipe reader and encoder adapted to be operative on the magnetic stripe of a card swiped through slot 101. The swipe reader may be adapted from any such reader currently available commercially. A hand operated imprinter may be operated independently and may be any such information currently in use.

The operation of the manual system is as follows:

The clerk hand swipes a customer's credit card through slot 101. Display 102 is adapted to indicate a valid read if it occurs. If a valid read is indicated, the clerk keys in the dollar amounts of the sale, presses an appropriate key to query the credit authorization network and stands by for a response.

If the clerk receives an authorization number, he swipes the magnetic stripe of the sales form pack through slot 101. The terminal is adapted to record the sales transaction data on the magnetic stripe of the sales slip pack. The clerk then writes the credit authorization number on the sales slip pack and then imprints the embossed characters of the customer's credit card on the sales slip pack. The usual distribution of copies occurs, the bank copy being delivered to the bank or credit card company.

The overall functions of a system in accordance with the principles of this invention are identical to those of existing systems except for the presence of a magnetic stripe on the sales slip pack, the recordation of transaction data on that tripe, the POS terminal adapted to encode that stripe, and the bank organization to read it.

What is claimed is:

1. A POS terminal including a tray for receiving a credit card and a sales slip in juxtaposition, said card and slip having first and second data bearing stripes in first and second reference positions, respectively, said terminal also including a stripe reader and an encoder in said first and second positions for reading and encoding data in said first and second stripes respectively, means responsive to a first signal for moving said tray in a first direction with respect to said reader and encoder and for activating said reader and encoder for reading data in said first stripe and for encoding the data read in said second stripe respectively.

2. A FOS terminal in accordance with claim 1 also including an imprinter, said card also having embossed characters thereon, means responsive to a second signal for moving said tray in a second direction with respect to said reader and encoder for imprinting said embossed characters on said sales slip.

3. A POS terminal in accordance with claim 2, wherein said stripes are magnetic and said reader and encoder are a magnetic stripe reader and a magnetic stripe encoder respectively.

4. A terminal in accordance with claim 3 also including a key pad, said encoder being responsive to entries at said key pad for encoding said second stripe.

5. An automatic data captive system including a point of sale (POS) terminal, said system also including a remote credit card issuer computer and a telephone link between said terminal and said remote computer, said terminal including a tray for receiving a credit card and a sales slip in juxtaposition, said credit card and said sales slip having first and second encodable stripes in first and second reference positions respectively, said terminal including a reader and an encoder in said first and second reference positions respectively, said terminal including means for generating a credit authorization number request signal to said computer over said telephone link, said terminal including means responsive to said signal for moving said tray in a first direction with respect to said reader and encoder for transferring data from said first to said second stripe.

6. A system in accordance with claim 5 wherein said computer includes means for sending a credit authorization number over said link to said terminal and said terminal includes means responsive to said number for moving said tray in a second direction with respect to said reader and encodere, said credit card including embossed characters thereon, said terminal including an imprinter activated in response to said number for imprinting said sales slip with said character.

7. A system in accordance with claim 6, wherein said stripes are magnetic and said reader and encoder are a magnetic stripe reader and magnetic stripe encoder, respectively.

8. A POS terminal including a tray for receiving a sales slip which includes a first encodable stripe, said terminal also including an encoder positioned to encode said stripe, said terminal also including a reader for reading a second encodable stripe on a credit card moved thereby, said terminal including means responsive to a first signal for reading said second stripe and encoding the data read on said first stripe.

9. A terminal in accordance with claim 8 also including a key pad, said encoder being responsive to entries at said key pad to encode said first stripe.

10. A terminal in accordance with claim 9 wherein said stripes are magnetic and said reader and encoder are a magnetic stripe reader and a magnetic stripe encoder respectively.

11. A terminal in accordance with claim 10 also including an imprinter, said credit card including embossed characters thereon, said terminal also including means responsive to a second signal for imprinting said embossed characters on said sales slip.

12. A method for collecting transaction data for automatic data entry into the computer of a bank, said method comprising the steps of forming a first encodable stripe on a bank copy of a sales slip, reading the data stored in a second encodable stripe on a customer's credit card, encoding the data so read on said first stripe and encoding transaction data also on said first stripe.

* * * * *